(12) United States Patent
Lee et al.

(10) Patent No.: US 10,559,304 B2
(45) Date of Patent: Feb. 11, 2020

(54) VEHICLE-MOUNTED VOICE RECOGNITION DEVICE, VEHICLE INCLUDING THE SAME, VEHICLE-MOUNTED VOICE RECOGNITION SYSTEM, AND METHOD FOR CONTROLLING THE SAME

(71) Applicants: Hyundai Motor Company, Seoul (KR); Kia Motors Corporation, Seoul (KR)

(72) Inventors: Jin Ho Lee, Gyeonggi-do (KR); Jae Min Joh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 101 days.

(21) Appl. No.: 15/804,673

(22) Filed: Nov. 6, 2017

(65) Prior Publication Data
US 2018/0350365 A1 Dec. 6, 2018

(30) Foreign Application Priority Data
May 30, 2017 (KR) .......................... 10-2017-0066530

(51) Int. Cl.
*G06F 17/27* (2006.01)
*G06F 17/21* (2006.01)
(Continued)

(52) U.S. Cl.
CPC .............. *G10L 15/22* (2013.01); *G10L 15/14* (2013.01); *G10L 15/265* (2013.01); *G10L 15/30* (2013.01);
(Continued)

(58) Field of Classification Search
CPC ....... G10L 15/22; G10L 15/265; G10L 15/30; G10L 2015/223; G06F 3/0482; H04L 63/104
See application file for complete search history.

(56) References Cited

U.S. PATENT DOCUMENTS 6,829,607 B1 * 12/2004 Tafoya ................. G06Q 10/107
8,862,467 B1 * 10/2014 Casado ................... G10L 15/22
704/231

(Continued)

*Primary Examiner* — Olujimi A Adesanya
(74) *Attorney, Agent, or Firm* — Mintz Levin Cohn Ferris Glovsky and Popeo, P.C.; Peter F. Corless

(57) ABSTRACT

A vehicle-mounted voice recognition device includes: a storage configured to store a plurality of databases for voice recognition generated based on an address book database sent from a terminal device; a processor configured to detect at least one element from the plurality of databases for voice recognition and determine an order of displaying contact information corresponding to the at least one element; and a user interface configured to display the contact information corresponding to the at least one element in the order of displaying and receive a selection of a piece of the contact information from a user. The processor is further configured to detect a database among the plurality of databases for voice recognition, the detected database including an element corresponding to the selected piece of contact information, and re-determine the order of displaying the contact information based on detection frequencies of the plurality of databases for voice recognition.

22 Claims, 12 Drawing Sheets

(51) Int. Cl.

| | | |
|---|---|---|
| *G10L 15/00* | (2013.01) | |
| *G10L 15/26* | (2006.01) | |
| *G10L 21/00* | (2013.01) | |
| *G10L 25/00* | (2013.01) | |
| *G10L 21/06* | (2013.01) | |
| *G10L 15/22* | (2006.01) | |
| *G10L 15/30* | (2013.01) | |
| *G10L 15/14* | (2006.01) | |

(52) U.S. Cl.
CPC ... *G10L 2015/223* (2013.01); *H04M 2250/74* (2013.01)

(56) References Cited

U.S. PATENT DOCUMENTS

| | | | | |
|---|---|---|---|---|
| 2005/0187768 | A1* | 8/2005 | Godden | G10L 15/08 704/238 |
| 2006/0009974 | A1* | 1/2006 | Junqua | G10L 15/083 704/257 |
| 2006/0035632 | A1* | 2/2006 | Sorvari | H04M 1/271 455/418 |
| 2007/0005206 | A1* | 1/2007 | Zhang | G06F 3/16 701/36 |
| 2007/0250320 | A1* | 10/2007 | Chengalvarayan | G10L 15/26 704/254 |
| 2007/0288456 | A1* | 12/2007 | Aravamudan | G06F 3/0481 |
| 2008/0033946 | A1* | 2/2008 | Bhogal | H04M 1/274583 |
| 2008/0259022 | A1* | 10/2008 | Mansfield | G06F 3/0237 345/156 |
| 2011/0087747 | A1* | 4/2011 | Hirst | G06Q 10/107 709/206 |
| 2012/0063585 | A1* | 3/2012 | Gravino | H04M 1/274516 379/218.01 |
| 2014/0241216 | A1* | 8/2014 | Cheng | H04M 3/436 370/271 |
| 2015/0100240 | A1* | 4/2015 | Toopran | G01C 21/3608 701/539 |
| 2015/0120288 | A1* | 4/2015 | Thomson | G10L 15/22 704/231 |
| 2015/0142428 | A1* | 5/2015 | Zhao | G10L 15/32 704/231 |
| 2015/0301696 | A1* | 10/2015 | D'Jesus Bencci | G06F 3/0482 715/752 |
| 2015/0325238 | A1* | 11/2015 | Dai | G10L 15/22 704/257 |
| 2015/0379987 | A1* | 12/2015 | Panainte | H04R 1/08 704/246 |

* cited by examiner

VEHICLE-MOUNTED VOICE RECOGNITION DEVICE, VEHICLE INCLUDING THE SAME, VEHICLE-MOUNTED VOICE RECOGNITION SYSTEM, AND METHOD FOR CONTROLLING THE SAME

CROSS-REFERENCE TO RELATED APPLICATION

This application claims the benefit of priority to Korean Patent Application No. 10-2017-0066530, filed on May 30, 2017, the disclosure of which is incorporated herein by reference in its entirety.

BACKGROUND

1. Technical Field

The present disclosure relates generally to vehicular technologies and, more particularly, to a vehicle-mounted voice recognition device, vehicle including the same, vehicle-mounted voice recognition system, and method for controlling the same.

2. Discussion of Related Art

Recently, various devices intended to enhance user convenience have been installed in vehicles. Such devices include, for example, a navigation system, a radio system, a television system, a vehicle-mounted voice recognition device, or the like. The devices may be designed to perform certain functions based on a manipulation of mechanical buttons, touch input on a touchscreen, recognition of a user's voice, or the like.

SUMMARY OF THE DISCLOSURE

The present disclosure provides a vehicle-mounted voice recognition device, vehicle including the same, vehicle-mounted voice recognition system, and method for controlling the same, which provides the user with suitable voice recognition results to meet a user's usage patterns or intents.

In accordance with embodiments of the present disclosure, a vehicle-mounted voice recognition device includes: a storage configured to store a plurality of databases for voice recognition generated based on an address book database sent from a terminal device; a processor configured to detect at least one element from the plurality of databases for voice recognition and determine an order of displaying contact information corresponding to the at least one element; and a user interface configured to display the contact information corresponding to the at least one element in the order of displaying and receive a selection of a piece of the contact information from a user. The processor is further configured to detect a database among the plurality of databases for voice recognition, the detected database including an element corresponding to the selected piece of contact information, and re-determine the order of displaying the contact information based on detection frequencies of the plurality of databases for voice recognition.

The vehicle-mounted voice recognition device may further include a sound receiver configured to receive a voice of the user and output a sound signal. The processor may be further configured to perform voice recognition on the sound signal to detect at least one element corresponding to the voice of the user from the plurality of databases for voice recognition.

The processor may be configured to further detect a confidential value for each of the at least one element corresponding to the voice of the user.

The processor may be configured to generate a corrected confidential value by modifying the confidential value for each of the at least one element according to the detection frequencies of the plurality of databases for voice recognition.

When a database among the plurality of databases for voice recognition including an element corresponding to the selected piece of contact information is detected, the processor may be further configured to increment and update a count corresponding to the detected database.

The processor may be configured to use a confidential value for each of the at least one element and the count corresponding to the detected database to determine a corrected confidential value for each of the at least one element.

The processor may be configured to use the corrected confidential value for each of the at least one element to re-determine the order of displaying the contact information.

The processor may be configured to use selection frequencies of a plurality of elements in the detected database to re-determine the order of displaying the contact information.

The processor may be configured to make a call with an outside terminal device corresponding to the selected piece of contact information using the terminal device.

The at least one element may include at least one of a family name, a first name, the first name followed by the family name, the family name followed by the first name, a monosyllabic word, and a uniquely pronounced word.

Furthermore, in accordance with embodiments of the present disclosure, a method for controlling a vehicle-mounted voice recognition device includes: receiving an address book database sent from a terminal device; generating a plurality of databases for voice recognition based on the address book database; detecting at least one element from the plurality of databases for voice recognition; determining an order of displaying contact information corresponding to the at least one element; displaying the contact information corresponding to the at least one element in the order of displaying; receiving a selection of a piece of the contact information from a user; detecting a database among the plurality of databases for voice recognition, the detected database including an element corresponding to the selected piece of contact information; and re-determining the order of displaying contact information based on detection frequencies of the plurality of databases for voice recognition.

The detecting of the at least one element from the plurality of databases for voice recognition may include: receiving a voice of the user; and outputting a sound signal; and performing voice recognition on the sound signal to detect at least one element from the plurality of databases for voice recognition.

The performing of voice recognition on the sound signal may comprise detecting the at least one element and a confidential value for each of the at least one element.

The re-determining of the order of displaying contact information may comprise generating a corrected confidential value by modifying the confidential value for each of the at least one element according to the detection frequencies of the plurality of databases for voice recognition.

The re-determining of the order of displaying contact information may comprise, when a database among the plurality of databases for voice recognition including an element corresponding to the selected piece of contact information is detected, incrementing and updating a count corresponding to the detected database.

The re-determining of the order of displaying contact information may comprise using a confidential value for each of the at least one element and the count corresponding to the detected database to determine a corrected confidential value for each of the at least one element.

The re-determining of the order of displaying contact information may comprise using the corrected confidential value for each of the at least one element to re-determine the order of displaying the contact information.

The method may further comprise: using selection frequencies of a plurality of elements in the detected database to re-determine the order of displaying the contact information.

The method may further comprise: making a call with an outside terminal device corresponding to the selected piece of contact information using the terminal device.

The at least one element may include at least one of a family name, a first name, the first name followed by the family name, the family name followed by the first name, a monosyllabic word, and a uniquely pronounced word.

Furthermore, in accordance with embodiments of the present disclosure, a vehicle-mounted voice recognition system includes: a terminal device including an address book database; and a vehicle-mounted voice recognition device configured to receive the address book database from the terminal device; generate a plurality of databases for voice recognition based on the address book database; detect at least one element from the plurality of databases for voice recognition; determine an order of displaying contact information corresponding to the at least one element; display the contact information corresponding to the at least one element in the order of displaying; and receive a selection of a piece of the contact information from a user. The vehicle-mounted voice recognition device is further configured to detect a database among the plurality of databases for voice recognition, the detected database including an element corresponding to the selected piece of contact information, and re-determine the order of displaying the contact information based on detection frequencies of the plurality of databases for voice recognition.

Furthermore, in accordance with embodiments of the present disclosure, a vehicle includes: a storage configured to store a plurality of databases for voice recognition generated based on an address book database sent from a terminal device; a processor configured to detect at least one element from the plurality of databases for voice recognition and determine an order of displaying contact information corresponding to the at least one element; and a user interface configured to display the contact information corresponding to the at least one element in the order of displaying and receive a selection of a piece of the contact information from a user. The processor is further configured to detect a database among the plurality of databases for voice recognition, the detected database including an element corresponding to the selected piece of contact information, and re-determine the order of displaying the contact information based on detection frequencies of the plurality of databases for voice recognition.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, described briefly below.

Figure 1:
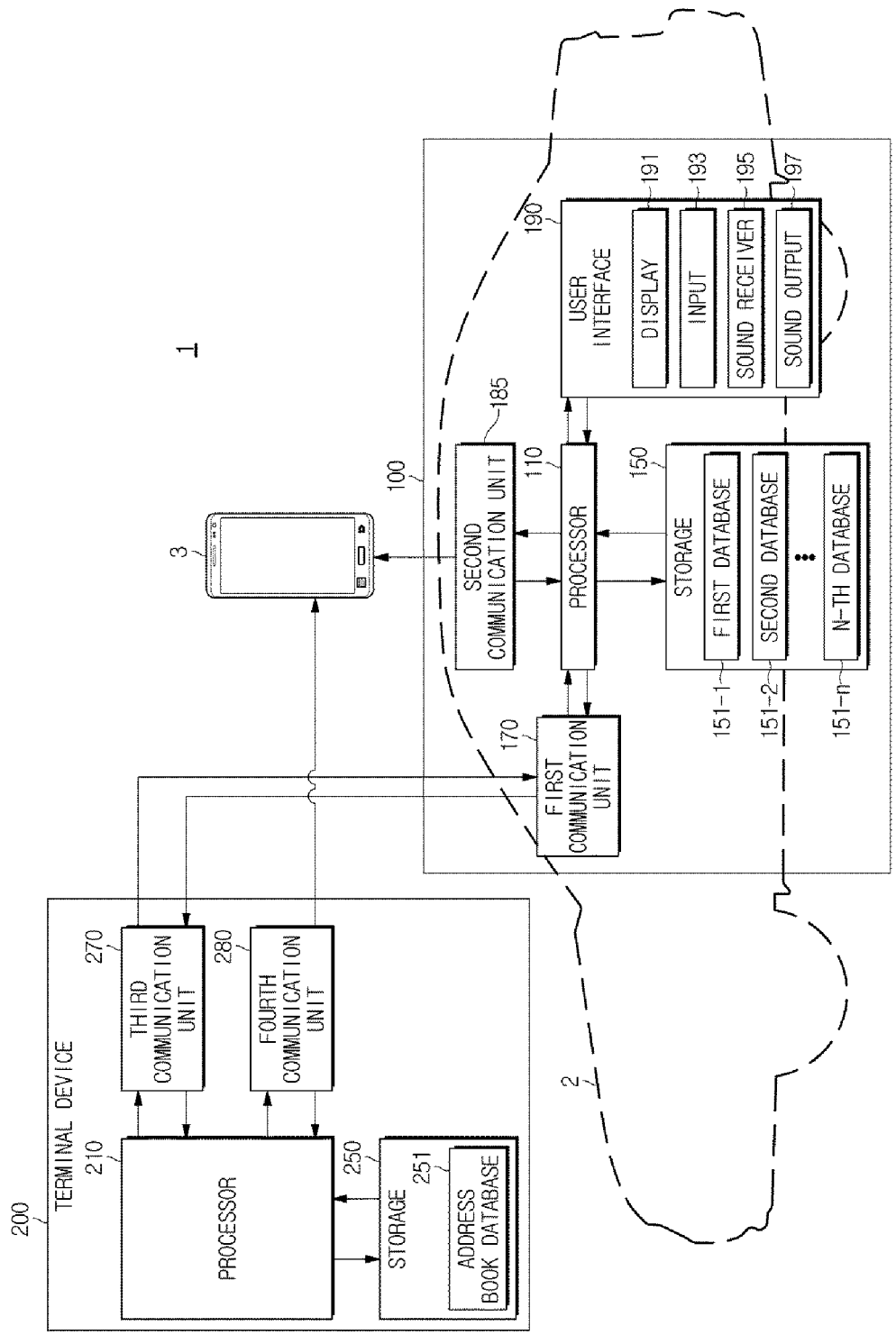
FIG. 1 is a block diagram of a vehicle-mounted voice recognition system, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF EXEMPLARY EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Embodiments of a vehicle-mounted voice recognition device, vehicle including the same, vehicle-mounted voice recognition system, and method for controlling the same will now be described with reference to FIGS. 1 to 9.

FIG. 1 is a block diagram of a vehicle-mounted voice recognition system, according to embodiments of the present disclosure.

As shown in FIG. 1, a vehicle-mounted voice recognition system 1 may include a vehicle-mounted voice recognition device 100 and a terminal device 200.

The vehicle-mounted voice recognition device 100 is mounted and installed on a vehicle 2 for recognizing voice from a user, such as a driver or a passenger. The vehicle-mounted voice recognition device 100 may include, for example, a vehicle-mounted calling device, which may be capable of making calls with other outside terminal device 3 by using the terminal device 200 or an extra communication module.

According to embodiments of the present disclosure, the vehicle-mounted voice recognition device 100 may include a processor 110, a storage 150, a first communication unit 170, and a user interface 190.

In some cases, at least one of the processor 110, the storage 150, the first communication unit 170, and the user interface 190 is configured to exchange data using at least one of cable and wireless communication networks. The cable may include e.g., a pair cable, a coaxial cable, an optical fiber cable, or an Ethernet cable.

The wireless communication network may be implemented using a short-range communication technology, e.g., Controller Area Network (CAN) communication, Wi-Fi, Zigbee, Bluetooth, Wi-Fi Direct, Bluetooth Low Energy, or Near Field Communication (NFC).

The processor 110 may control general operation of the vehicle-mounted voice recognition device 100. The processor 110 may be implemented using e.g., at least one Central Processing Unit (CPU), at least one Micro Controller Unit (MCU), or at least one Electronic Control Unit (ECU).

In some cases, the processor 110 may be implemented using an ECU mounted and installed directly on the vehicle 2 or using a processor of another electronic device provided separately from the vehicle 2. For example, the processor 110 may be implemented using a CPU or MCU embedded in a navigation system, a head unit, or a smart phone, which may be attached to and detached from the vehicle 2.

According to embodiments of the present disclosure, the processor 110 may receive an address book database 251 from the terminal device 200, and create a database for voice recognition from the received address book database 251.

For example, the processor 110 may receive the address book database 251 from the terminal device 200, and extract respective records themselves stored in the address book database 251 according to what are determined in advance, or extract at least one field data, e.g., a family name or a first name, included in the at least one record, or vary the order of the extracted at least one field data to create a new record, and/or add new field data to the extracted record to create multiple databases for voice recognition 151 (151-1, 151-2, . . . , 151-n). Besides, the processor 110 may use at least one of various methods that may be considered by the designer to create the multiple databases for voice recognition 151 (151-1, 151-2, . . . , 151-n).

The processor 110 may also obtain at least one element from the database for voice recognition 151 by using sound data received from a sound receiver 195. The at least one element may include an identifier spoken by the user to make a voice call. The identifier may include, for example, at least one of a person's family name, first name, nick name, title, position, and job.

For example, the processor 110 may detect a voice part from the sound data, compare the detected voice part with data stored in the database for voice recognition 151 to obtain a record including at least one element corresponding to the voice part, e.g., the identifier, and generate a control signal for a user interface 190 or a second communication unit 185 based on the obtained results.

Also, the processor 110 may extract a feature of the voice, determine a pattern using the extracted feature and an acoustic model, compare and match the determined pattern with a predetermined pattern, perform voice recognition based on the match result, and obtain at least one element among a plurality of elements stored in the database for voice recognition 151 based on the voice recognition result. The acoustic model may be predefined by the designer.

According to embodiments of the present disclosure, the processor 110 may determine one or more words or phrases corresponding to the voice part according to the match result, and compare the obtained one or more words or phrases with the plurality of elements stored in the database for voice recognition 151 to detect at least one element from the database for voice recognition 151.

The processor 110 may also use the database for voice recognition 151 as the acoustic model, compare the determined pattern with the plurality of elements stored in the database for voice recognition 151, and detect at least one element from the database for voice recognition 151.

If required, the processor 110 may be designed to further use a certain language model to perform the voice recognition.

The processor 110 may perform voice recognition using at least one of a Dynamic Time Warping (DTW) method, Hidden Markov models, and an Artificial Neural Network (ANN) in some embodiments.

Furthermore, the processor 110 may obtain confidential values corresponding to the respective elements detected from the database for voice recognition 151 in the process of voice recognition. The confidential value numerically represents how much reliable the voice recognition result is. Specifically, for example, the confidential value may be defined by how much a voice detected from the acoustic data is matched with an element from the database for voice recognition 151. The confidential value may be obtained using a certain probability model. The confidential value may be obtained in the process of voice recognition using the acoustic model or language model.

The processor 110 may also obtain corrected confidential values by maintaining or correcting the confidential values on the user's selection basis. The processor 110 may adjust the confidential value of at least one contact stored in the database for voice recognition 151 according to a search result selected by the user.

According to embodiments of the present disclosure, the processor 110 may detect at least one database for voice recognition 151 among a plurality of databases for voice recognition based on the user's selection, and determine the confidential values of contacts stored in the at least one database for voice recognition 151 based on detection frequency of the database 151 for voice recognition. The database for voice recognition 151 detected by the processor 110 may include a database for voice recognition including a contact selected by the user.

Specifically, for example, once the user selects an element, the processor 110 may search for and determine database for voice recognition 151 (151-1, 151-2, . . . , 151-n), from which the selected element is detected, and equally correct or adjust the confidential value of a voice recognition result of at least one element detectable from the determined database for voice recognition 151 (151-1, 151-2, . . . , 151-n). The processor 110 may further correct or adjust the confidential value of a particular element corresponding to the user's selection, based on user selection frequency, as needed.

The processor 110 may generate a control signal to operate the user interface 190 or the second communication unit 185 based on the confidential value or the corrected confidential value.

According to embodiments of the present disclosure, once at least one element is detected, the processor 110 may obtain a contact corresponding to at least one element, and control the user interface 190 based on the obtained element and contact to visually or audibly provide the user with the at least one contact. In this case, the processor 110 may determine an order of displaying the contact information according to the confidential values or the corrected confidential values corresponding to the respective elements. The at least one contact is provided for the user in the determined order of displaying the contact information.

If the user selects at least one contact from among the at least one contact provided, the processor 110 may control the vehicle-mounted voice recognition device 100 to be connected for communication to at least one of the terminal device 200 and an outside terminal device 3.

Operation of the processor 110 will be described in more detail later.

The storage 150 may temporarily or non-temporarily store information required to operate the vehicle-mounted voice recognition device 100.

The storage 150 may include, e.g., a main memory device and/or an auxiliary memory device. The main memory device may be implemented using a semiconductor storage medium, such as a Read-Only Memory and/or Random Access Memory (RAM). The ROM may include e.g., an erasable and programmable ROM (EPROM), an electrically erasable and programmable ROM (EEPROM) and/or a mask-ROM. The RAM may include e.g., a dynamic RAM (DRAM) and/or a static RAM (SRAM). The auxiliary memory device may be implemented using at least one storage medium, such as a flash memory device, a Secure Digital (SD) card, a solid state drive (SSD), a hard disc drive (HDD), a magnetic drum, a compact disk (CD), a laser disk (LD), a magnetic tape, an magneto-optical disc and/or floppy disk.

According to embodiments of the present disclosure, the storage 150 may store the database for voice recognition 151 obtained by the processor 110 of the vehicle-mounted voice recognition device 100 or a processor 210 of the terminal device 200.

The storage 150 may store a plurality of databases for voice recognition 151 (151-1, 151-2, . . . , 151-n). In the following description, for convenience of explanation, the respective databases for voice recognition 151 (151-1, 151-2, . . . , 151-n) will be called first database for voice recognition 151-1, second database for voice recognition 151-2, . . . , and n-th database for voice recognition 151-n.

The storage 150 may store confidential values calculated by the processor 110, and even information required to calculate the confidential values. For example, the storage 150 may store weights for the respective databases for voice recognition 151 (151-1, 151-2, . . . , 151-n). In this case, variables for pointing to the weights may be defined to be as many as the number of databases for voice recognition 151 (151-1, 151-2, . . . , 151-n). Alternatively, the storage 150 may store weights for the respective elements in the same database for voice recognition 151 (151-1, 151-2, . . . , 151-n).

The storage 150 may provide the database for voice recognition 151, the confidential value, and information required to calculate the confidential value to the processor 110 over a cable or wireless communication network, in response to a call from the processor 110, and receive and store the processing results from the processor 110.

The database for voice recognition 151 (151-1, 151-2, . . . , 151-n) may include at least one record, each record including an identifier and at least one field data corresponding to the identifier. The field data may refer to data corresponding to at least one field of a record. The identifier may include, e.g., first name, family name, a combination of family name and first name in the sequence, a combination of first name and family name in the sequence, title, and/or predetermined other identifier. The field data may include at least one contact, such as a phone number or an email address. The phone number may include at least one of a cell phone number, an office phone number, and a home phone number.

Records from different databases for voice recognition 151 (151-1, 151-2, . . . , 151-n) may be built to have different identifiers. For example, the first database for voice recognition 151-1 may be built with only first names for the identifier, and the second database for voice recognition 151-2 may be built with only family names for the identifier. In this case, field data of records from the different databases for voice recognition 151 (151-1, 151-2, ..., 151-n) may or may not be the same.

The first communication unit 170 may be configured to communicate with a third communication unit 270 of the terminal device 200 wiredly or wirelessly, and implemented to have an antenna, a communication chip, a substrate, and relevant parts as needed.

The vehicle-mounted voice recognition device 100 may receive an address book database 251 through communication between the first and third communication units 170 and 270.

Furthermore, the vehicle-mounted voice recognition device 100 may transmit a voice signal of the user received through the sound receiver 195 over a communication network established between the first and third communication units 170 and 270 to the terminal device 200, and receive a voice signal sent from the outside terminal device 3 via the terminal device 200, enabling a call to be made with the outside terminal device 3. The voice signal received by the vehicle-mounted voice recognition device 100 from the terminal device 200 may be output through a sound output 197, and accordingly, the user may make a voice call with the outside terminal device 3.

The first communication unit 170 may perform communication with the third communication unit 270 using a short-range communication scheme. For example, the first communication unit 170 may perform communication with the third communication unit 270 using the CAN communication, Wi-Fi, Wi-Fi Direct, Zigbee, Bluetooth, Bluetooth low energy, or NFC, and include various relevant parts.

The user interface 190 may be configured to receive various commands from the user and/or to visually or audibly provide various information for the user.

The user interface 190 may be independently manufactured and then mounted on the vehicle 2. In this case, the user interface 190 may be implemented using, e.g., a navigation system such as an Audio Video Navigation (AVN) system or a head unit that may be mounted on the center fascia.

According to embodiments of the present disclosure, the user interface 190 may include a display 191 and an input 193.

The display 191 may provide the user with visual information relating to operation of the vehicle-mounted voice recognition device 100 installed in the vehicle 2 in numbers, symbols, letters, figures, and/or shapes.

The display 191 may be implemented using e.g., a plasma display panel (PDP), a light emitting diode (LED) display panel, a liquid crystal display (LCD), or the like. The LED panel may include organic LEDs, which may be implemented using passive matrix OLEDs (PMOLEDs) or active matrix OLEDs (AMOLEDs).

According to embodiments of the present disclosure, the display 191 may display a contact obtained by voice recognition of the processor 110. In this case, the display 191 may display a single contact or multiple contacts on a screen. If multiple contacts are detected by the processor 110, the display 191 may display the multiple contacts simultaneously or sequentially under the control of the processor 110. In the case of displaying the multiple contacts, the display 191 may sequentially display the contacts from top to bottom based on their confidential values. In the case of displaying at least one contact, the display 191 may display at least one contact earlier based on the confidential value.

The input 193 may receive a command or data from the user. The input 193 may include, e.g., a mechanical button, a mouse, a knob, a joy stick, various sensors such as a sensor on a touch pad or touch screen, a function sensor, and the like, or an interface terminal such as Universal Serial Bus (USB) terminal or High Definition Multimedia Interface (HDMI) terminal.

After at least one contact is displayed by the display 191, the input 193 may receive a command to select one of the at least one contact from the user, and send an electric signal corresponding to the selection command to the processor 110.

The sound receiver 195 may receive a sound wave from the outside, convert the sound wave to an electric signal, and output the electric signal corresponding to the sound wave. The electric signal output by the sound receiver 195 may be sent to the processor 110 through e.g., a cable. The sound wave received by the sound receiver 195 may include a voice produced by the user.

A sound received by the sound receiver 195 and including a voice may be sent to the processor 110 in the form of an electric signal, recognized by the processor 110, and used to search for at least one contact.

The sound received by the sound receiver 195 may also be sent to the terminal device 200 through the first and third communication units 170 and 270 in the form of a certain electric signal, and then sent to the outside terminal device 3 over a mobile communication network.

The sound receiver 195 may include, e.g., a microphone.

The sound receiver 195 may be installed in the interior of the vehicle 2. The sound receiver 195 may be installed at a location, at which to easily receive what is spoken by the driver or the passenger. For example, the sound receiver 20 may be installed in a region adjacent to at least one of the driver and the passenger, such as center fascia, steering wheel, instrument panel or the vicinity, rear view mirror or the vicinity, and/or the vicinity of sun visor, taking into account a propagation direction of sound. If necessary, there may be two or more sound receivers 195 installed in the single vehicle 2.

The sound output 197 is configured to output sound including a voice. The sound output 197 may output a voice, which has been input to the outside terminal device 3 and then delivered from the terminal device 200 through the first and third communication units 170 and 270.

With the aforementioned operations of sound reception of the sound receiver 195 and sound output of the sound output 197, the user may make a call with a user of the outside terminal device 3.

The sound output 197 may be implemented using, e.g., at least one speaker device. The at least one speaker device may be installed in, e.g., a door of the vehicle 2, the dashboard, the center fascia, or the rear shelf.

The vehicle-mounted voice recognition device 100 may further include a second communication unit 185 in embodiments of the present disclosure.

The second communication unit 185 may perform communication with the outside terminal device 3 directly or via an extra server (not shown). The second communication unit 185 may be configured to perform communication with the outside terminal device 3 using a mobile communication technology. For example, the second communication unit 185 may use a communication technology based on a mobile communication standard of 3GPP, 3GPP2, or WiMax series to perform communication with the outside terminal device 3.

With the second communication unit 185, the vehicle-mounted voice recognition device 100 may be able to communicate with the outside terminal device 3 without communication with the terminal device 200. Accordingly, the user, e.g., the driver or the passenger, may be able to make a call with the user of the outside terminal device 3 using the vehicle-mounted voice recognition device 100 without paring between the vehicle-mounted voice recognition device 100 and the terminal device 200.

The second communication unit 185 may be omitted in some cases.

The terminal device 200 is configured to be able to communicate with at least one of the vehicle 2 and the outside terminal device 3.

The terminal device 200 may include at least one of, e.g., a cellular phone, a smart phone, a tablet Personal Computer (PC), a desktop computer, a laptop computer, a navigation system, a portable game device, a personal digital assistant (PDA), and a wearable device such as smart glasses, a smart ring, or a smart watch. Besides, at least one of many different kinds of terminal devices capable of storing an address book database and performing communication with the first communication unit 170 of the vehicle-mounted voice recognition device 100 may be an example of the aforementioned terminal device 200.

The terminal device 200, according to embodiments of the present disclosure, may include a processor 210, a storage 250, a third communication unit 270, and a fourth communication unit 280.

The processor 210 may be configured to control general operation of the terminal device 200. The processor 210 may include e.g., a CPU, an MCU, or an ECU.

The processor 210 may create an address book database 251 by combining at least one contact according to the user's manipulation or predetermined settings and storing them in the storage 250, and/or detect at least one contact from the address book database 251 stored in the storage 250.

According to embodiments of the present disclosure, the processor 210 may create the database for voice recognition 151 from the address book database 251 in the same way or in a partially modified way as or from the aforementioned way of the processor 110 of the vehicle-mounted voice recognition device 100. In this case, the processor 210 may create all or part of the plurality of databases for voice recognition 151 (151-1, 151-2, . . . , 151-n) stored in the storage 150 of the vehicle-mounted voice recognition device 100.

The database for voice recognition 151 created by the processor 210 may be sent to the vehicle-mounted voice recognition device 100 via the third and first communication units 270 and 170 or via the fourth and second communication units 280 and 185. The database 151 for voice recognition 151 created by the processor 210 may be sent to the vehicle-mounted voice recognition device 100 every time the vehicle-mounted voice recognition device 100 and the terminal device 200 is paired to each other; alternatively, the database for voice recognition 151 created by the processor 210 may be sent to the vehicle-mounted voice recognition device 100 according to the user's manipulation; alternatively, the database for voice recognition 151 created by the processor 210 may be sent to the vehicle-mounted voice recognition device 100 at certain intervals according to predetermined settings.

According to embodiments of the present disclosure, the processor 210 may control the operation of sending the address book database 251 to the processor 110 of the vehicle-mounted voice recognition device 100 but may not create the database for voice recognition 151. In this case, the processor 110 of the vehicle-mounted voice recognition device 100 may single-handedly create all the plurality of databases for voice recognition 151 (151-1, 151-2, . . . , 151-n).

The storage 250 may temporarily or non-temporarily store information required to operate the terminal device 200.

The storage 250 may include a main memory device such as a ROM or RAM, and an auxiliary memory device such as a flash memory or SD card.

The storage 250 may store the address book database 251. The address book database 251 may be implemented to have at least one record corresponding to at least one contact, and the at least one record may include at least one field data corresponding to at least one identifier and at least one field. The at least one identifier of the address book database 251 may include at least one of e.g., a first name, a family name, a combination of the first name and the family name in the sequence, a title, and predefined other identifier, and the at least one field data may include at least one contact, such as a phone number or an email address.

Depending on types of the terminal device 200, various identifiers may be defined and stored in the storage 250. For example, a terminal device may be designed to define and store an identifier of first name and family name in the sequence, and another terminal device may be designed to define and store an identifier of family name and first name in the sequence.

According to embodiments of the present disclosure, the storage 250 may temporarily or non-temporarily store the database for voice recognition 151 obtained from the address book database 251.

The third communication unit 270 is configured to be able to communicate with the first communication unit 170 of the vehicle-mounted voice recognition device 100. The third communication unit 270 may include an antenna, a communication chip, and relevant parts as needed.

The third communication unit 270 may be configured to send a voice signal sent from the outside terminal device 3 through a fourth communication unit 280 to the vehicle-mounted voice recognition device 100, and/or enable a call to be made between the vehicle-mounted voice recognition device 100 and the outside terminal device 3 by receiving a voice signal from the vehicle-mounted voice recognition device 100.

The third communication unit 270 may be implemented using a communication module capable of performing short-range communication. The communication module capable of performing short-range communication may be manufactured to perform communication using at least one of Bluetooth, Bluetooth low energy, Wi-Fi, Wi-Fi Direct, CAN communication, Zigbee, and NFC.

The fourth communication unit 280 may perform communication with the outside terminal device 3 directly or via an extra server. The fourth communication unit 280 is implemented using at least one communication chip, an antenna, a substrate, or a relevant part.

According to embodiments of the present disclosure, the fourth communication unit 280 may be configured to perform communication with the outside terminal device 3 using a mobile communication technology. For example, the fourth communication unit 280 may use a communication module and program produced based on a mobile communication standard of 3GPP, 3GPP2, or WiMax series to perform communication with the outside terminal device 3.

The terminal device 200 may further include a user interface for receiving a command from the user or providing various information for the user as needed. The user interface may include a display that may be implemented with a display panel, and an input that may be implemented with a touch screen, many different mechanical buttons, a speaker device, or various sensors. The user may input an identifier or a contact corresponding to the identifier directly to the terminal device 200 by manipulating the mechanical buttons or the touch screen equipped in the terminal device 200.

The outside terminal device 3 may be configured to be able to communicate with at least one of the vehicle-mounted voice recognition device 100 and the terminal device 200 by means of a certain communication module. Through communication between them 3, 100, 200, the user of the outside terminal device 3 may be able to make a call with the user of at least one of the vehicle-mounted voice recognition device 100 and the terminal device 200 by means of the outside terminal device 3.

The terminal device 3 may include at least one of, e.g., a cellular phone, a smart phone, a tablet Personal PC, a desktop computer, a laptop computer, a navigation system, a portable game device, a PDA, and a wearable device such as smart glasses, a smart ring, or a smart watch. The outside terminal device 3 is not, however, limited thereto, but may be any device capable of communicating with at least one of the vehicle-mounted voice recognition device 100 and the terminal device 200.

Modes of operation of the processor 110, according to embodiments of the present disclosure, will now be described with reference to FIGS. 2 to 9.

Figure 2:
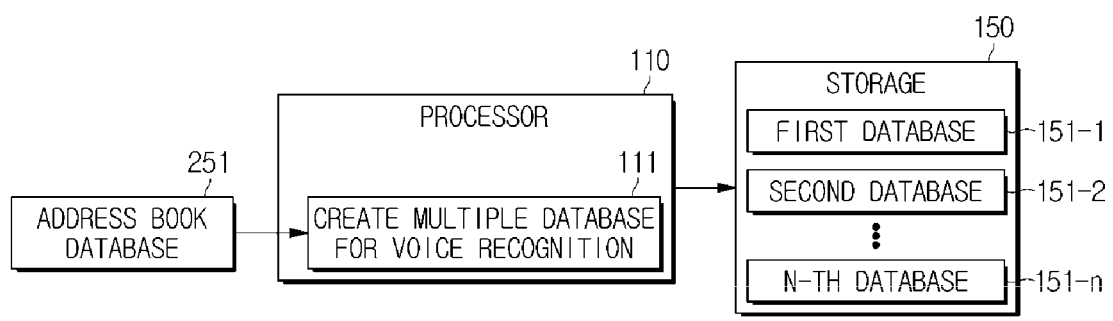
FIG. 2 is a first diagram for explaining an example of operation of a processor creating a plurality of databases for voice recognition.
Figure 3:
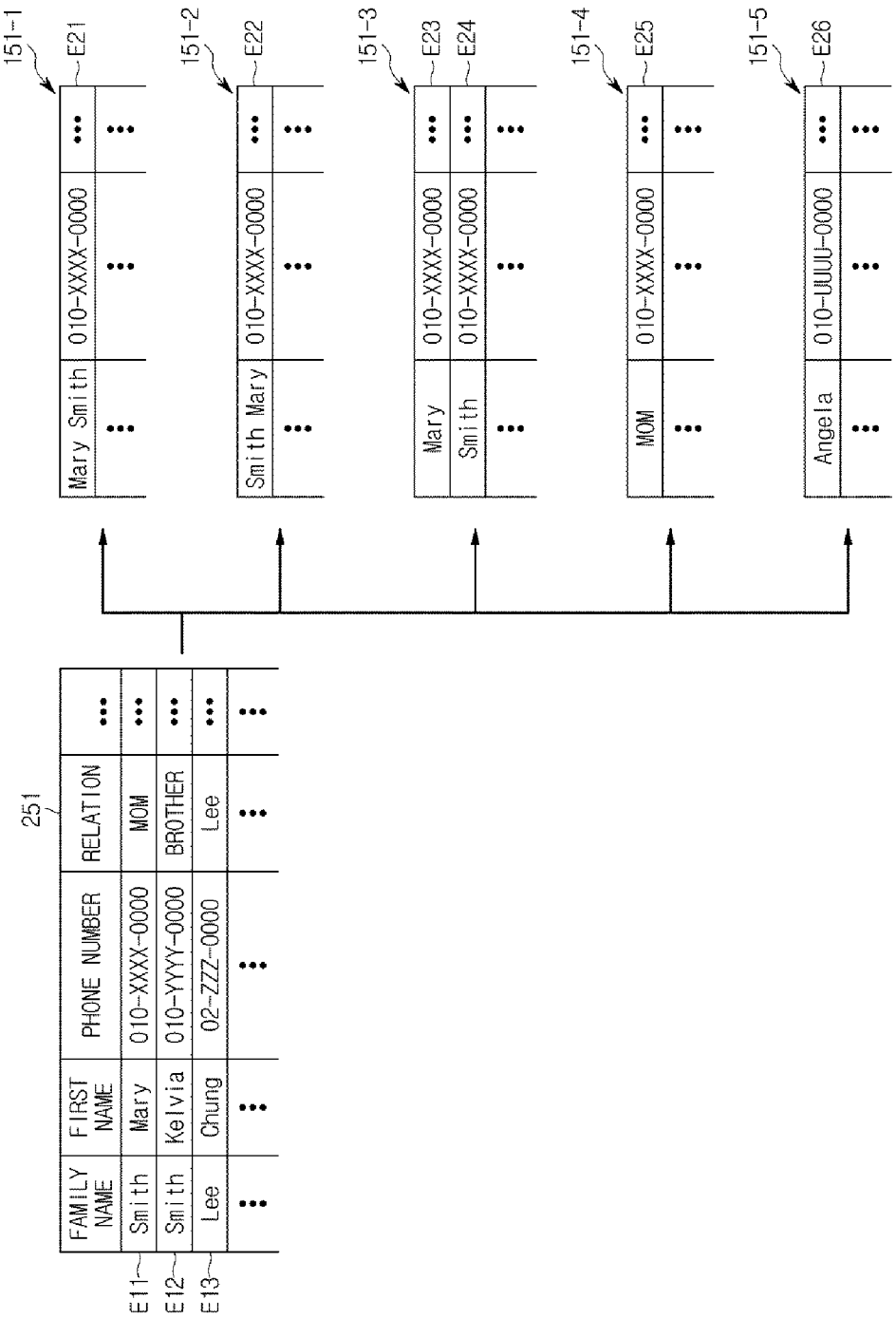
FIG. 3 is a second diagram for explaining an example of operation of a processor creating a plurality of databases for voice recognition.

FIG. 2 is a first diagram for explaining an example of operation of a processor creating a plurality of databases for voice recognition, and FIG. 3 is a second diagram for explaining an example of operation of a processor creating a plurality of databases for voice recognition.

Referring first to FIG. 2, the processor 110 may receive the address book database 251 from the terminal device 200 and create the plurality of databases for voice recognition 150 (150-1, 150-2, . . . , 150-n) from the address book database 251, in 111.

The address book database 251 may store at least one of a family name, a first name, a title, a position, and a job to identify a particular person, corresponding field data, e.g., a phone number or an email address, in the form of data. The processor 110 may separate one of the family name, the first name, the nickname, the title, the position and the job of the address book database 251 or combine at least two of the family name, the first name, the nickname, the title, the position and the job in various sequences, and assign corresponding field data to the separation or combination result to create the database for voice recognition 150 (150-1, 150-2, . . . , 150-n).

For example, the processor 110 may read out the respective records E11, E12, E13 of the address book database 251, as shown in FIG. 3, combine the family name and the first name stored in the respective records E11, E12, E13 in the order of the first name and the family name, and create the first database for voice recognition (151-1) based on the combination of the first name and the family name. In this case, the first database for voice recognition 151-1 may include at least one record E21 having the combination of the first name and the family name.

Furthermore, the processor 110 may build the second database for voice recognition 151-2 by combining the family name and the first name stored in the respective records E11, E12, E13 in the order of the family name and the first name, which is the opposite to the previous order of combination, to create at least one record E22.

In the case of building the second database for voice recognition (151-2) with the family name and the first name combined in the opposite order, even if the family name and the first name are delivered the other way around due to a communication error between the terminal device 200 and the build the vehicle-mounted voice recognition device 100 or even if the family name and the first name are spoken in the opposite order to the typical occasion due to the user's language habit, the user's sound may be relatively suitably and correctly recognized.

The processor 110 may further build the third database for voice recognition 151-3. In this case, the processor 110 may build the third database for voice recognition 151-3 by separating and extracting at least one of the family name and the first name from the respective records E11, E12, E13 read out and storing at least one of the extracted family name and first name.

For example, the third database for voice recognition 151-3 may include one of a record E23 only having the first name and a record E24 only having the first name. In another example, the third database for voice recognition 151-3 may be built by including both the record E23 having the family name and corresponding field data and the record E24 having the first name and corresponding field data.

Furthermore, the processor 110 may further build a fourth database for voice recognition 151-4 including monosyllabic word(s) frequently used by the user, e.g., mom or dad.

For example, the processor 110 may build the fourth database for voice recognition 151-4 by creating monosyllabic word(s) frequently used by the user, and/or by extracting a monosyllabic word, e.g., mom, from the respective records E11, E12, E13 of the address book database 251.

The processor 110 may further create a fifth database for voice recognition 151-5 comprised of uniquely pronounced word(s).

For example, in order to recognize a different language from English or French, for example, a Spanish or Portuguese, more correctly, the processor 110 may create at least one record E26 including an identifier recognizable by particularly linguistic pronunciation, e.g., a Spanish first name or family name and corresponding filed data, e.g., a contact, and build the fifth database for voice recognition 151-5 based on the record E26.

According to embodiments of the present disclosure, the processor 110 may also build the first to fifth databases for voice recognition 151-1 to 151-5 by further adding corresponding field data, e.g., a phone number, to the combination of the first name and the family name in the sequence, the combination of the family name and the first name in the sequence, the family name, the first name, a monosyllabic word or uniquely pronounced word, as needed.

The processor 110 may create all or part of the first to fifth databases for voice recognition 151-1 to 151-5. Also, the processor 110 may further build other database for voice recognition (not shown) as required by the designer.

The first to fifth databases for voice recognition 151-1 to 151-5 created by the processor 110 are stored in the storage 150.

Figure 4:
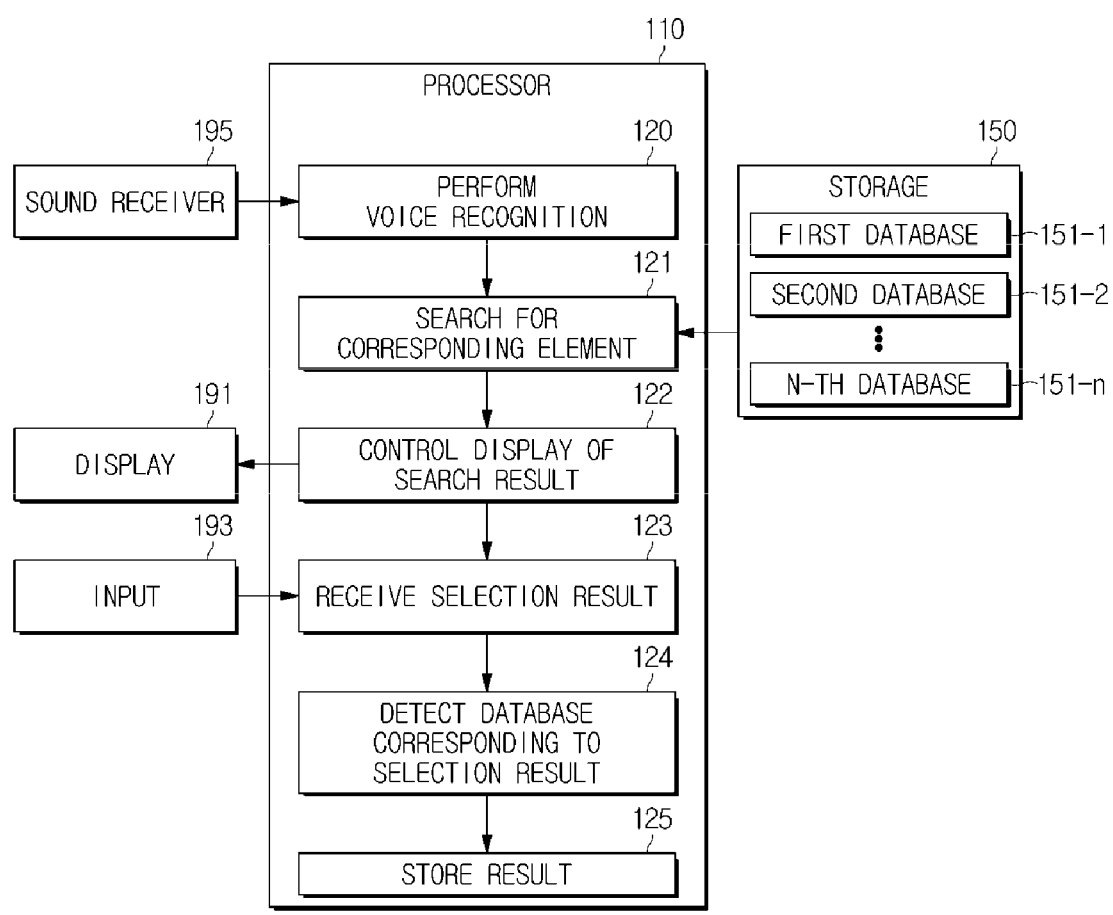
FIG. 4 is a diagram for explaining an example of operation of the processor.

FIG. 4 is a diagram for explaining an example of operation of the processor.

After the at least one of the databases for voice recognition 151 (151-1, 151-2, . . . , 151-*n*) is created, the user may speak in the vehicle 2. In this regard, the user may speak a family name, a first name, or the combination of the family name and the first name of a person to make a call with. The user may speak a word representing a relationship with the user, e.g., mom, a title, etc. In addition, the user may speak the family name or first name of a person in a different pronunciation system of his/her spoken language than English or French.

The sound receiver 195 may receive a sound including the user's voice, convert the received sound to a corresponding electric signal, and send the electric signal to the processor 110. The processor 110 may perform voice recognition based on the electric signal, in 120.

According to embodiments of the present disclosure, the processor 110 may extract a voice part of the user from the received sound, and perform a process of extracting a feature of the voice from the extracted voice part in the form of a feature vector. The processor 110 may further perform a process of determining a pattern corresponding to the extracted feature using a certain acoustic model. It is also possible for the processor 110 to further perform a language processing process using the pattern corresponding to the extracted feature based on a language model.

The processor 110 may read the storage 150 to call the database for voice recognition 151 (151-1, 151-2, . . . , 151-*n*) stored in the storage 150, and compare the respective elements of the database for voice recognition 151 (151-1, 151-2, . . . , 151-*n*) with at least one of the extracted or determined feature, pattern, and language processing results. Accordingly, the processor 110 may detect at least one element corresponding to the voice produced by the user, e.g., a stored identifier such as a family name, a first name, the combination of the family name and the first name, a monosyllabic word or a uniquely pronounced word from the database for voice recognition 151 (151-1, 151-2, . . . , 151-*n*), in 121. In this case, the processor 110 may be designed to detect at least one element corresponding to the voice produced by the user by detecting a corresponding identifier to the recognized voice, e.g., a family name or a first name.

The processor 110 may sequentially read the plurality of databases for voice recognition 151 (151-1, 151-2, . . . , 151-*n*) according to predetermined settings, and detect at least one element corresponding to the voice produced by the user from the at least one database for voice recognition 151 (151-1, 151-2, . . . , 151-*n*).

According to embodiments of the present disclosure, the processor 110 may sequentially read the first to n-th databases for voice recognition 151 (151-1, 151-2, . . . , 151-*n*). For example, the processor 110 may read the first database for voice recognition 151-1 with an identifier formed by combining the first name and the family name in the sequence, search the second database for voice recognition 151-2 with an identifier formed by combining the family name and the first name in the sequence, search the third database for voice recognition 151-3 with an identifier defined by the family name or the first name alone, and then detect at least one element from the respective databases for voice recognition 151-1 to 151-3.

If at least one element is detected, the at least one element may be assigned metadata to indicate its source to determine which one of the databases for voice recognition 151 (151-1, 151-2, . . . , 151-*n*) the at least one element was detected from.

The processor 110 may detect at least one element from the plurality of databases for voice recognition 151 (151-1, 151-2, . . . , 151-*n*) based on the confidential value. For example, the processor 110 may detect at least one element by comparing records, features or patterns of the respective databases for voice recognition 151 (151-1, 151-2, . . . , 151-*n*) and extracting at least one record with a confidential value of the comparison result higher than a predetermined threshold.

Once the at least one element is detected, the processor 110 may detect field data corresponding to the element, e.g., a contact such as a phone number, and accordingly, may obtain contact information. The contact information may include an identifier and a contact.

Figure 5:
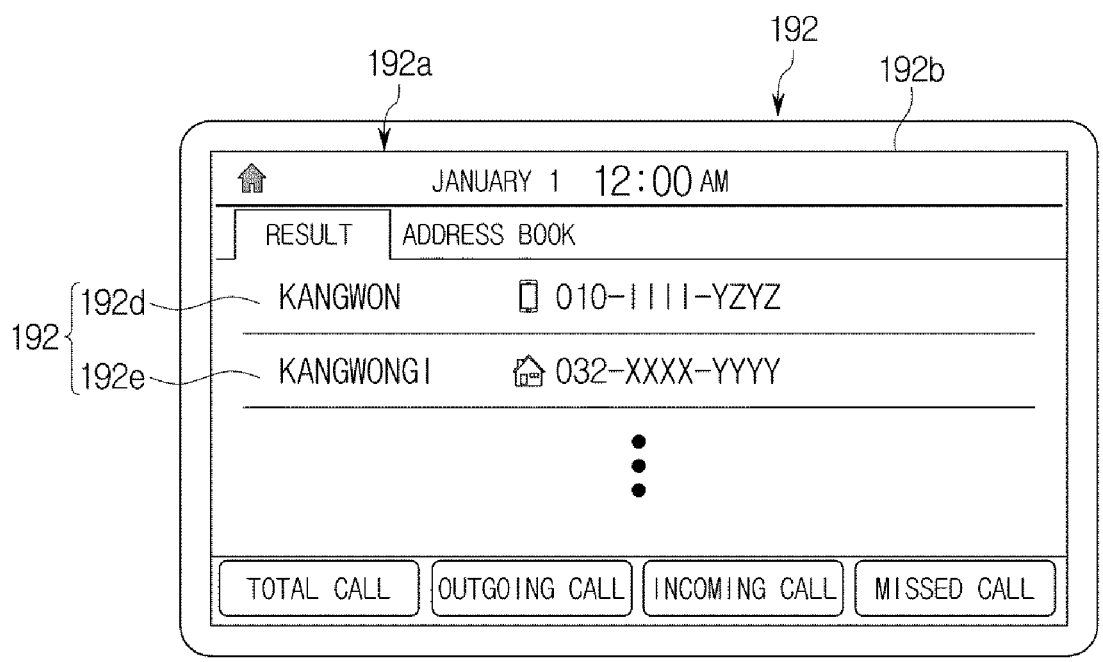
FIG. 5 shows an example of a screen displayed on a display.

FIG. 5 shows an example of a screen displayed on a display.

If at least one element is searched for and obtained, and then a contact corresponding to the element is obtained, the processor 110 may control the display 191 of the user interface 190 to display the search result, in 122. The display 191 may display multiple contact information 192*d*, 192*e* corresponding to the detected element, e.g., an identifier and corresponding contact of the detected record on a screen 192*b*.

As shown in FIG. 5, the display 151 may be implemented using the AVN system 192. In this case, the AVN system 192 may be implemented using a certain display panel 192*a*.

The certain display panel 192*a* may display a screen 192*b* designed to present search results of the processor 110. One or more pieces of contact information 192 resulting from search operation of the processor 110 may be displayed on the screen 192*b*. The contact information 192 may include an identifier, e.g., a first name, a family name, a combination of the first name and the family name in the sequence, a combination of the family name and the first name in the sequence, a monosyllabic word, or any word used for identification, field data corresponding to the identifier, e.g., a phone number.

According to embodiments of the present disclosure, as shown in FIG. 5, multiple contact information 192*d*, 192*e* resulting from search, e.g., a plurality of identifiers and field data corresponding to each of the plurality of identifiers, may be displayed on the screen 192*d* at the same time. In this case, the multiple contact information 192*d*, 192*e* may be displayed on the screen 192*b* in the order of displaying contact information. The order of displaying contact information may be determined based on e.g., confidential values of elements corresponding to the multiple contact information 192*d*, 192*e*. For example, contact information 192*d* with a high confidential value of a corresponding element may be displayed at a relatively higher position while contact information 192*e* with a low confidential value of a corresponding element may be displayed at a relatively lower position.

In addition, one of the multiple contact information may be displayed on the screen 192*b*. If the multiple contact information is obtained by the processor 110, the respective contact information may be sequentially displayed according to the user's manipulation or a predefined setting. For example, the respective contact information is time varying, and the time-varying contact information may be displayed. In this case, the respective contact information may be displayed in a certain order of displaying contact information based on confidential values of elements corresponding to the respective contact information. For example, contact information with a high confidential value of a corresponding element may be displayed relatively early, while contact information with a low confidential value of a corresponding element may be displayed relatively later.

The user may select one of the multiple contact information by manipulating the input 193 in such a way as pressing a mechanical button or touching the touch screen. For example, the user may select contact information intended by the user to call, e.g., 'Kangwon' 191d of FIG. 5, from among the multiple contact information. The selection result is sent to the processor 110, which in turn receives the selection result, in 123.

The processor 110 detects at least one database for voice recognition 151 (151-1, 151-2, ..., 151-n) corresponding to the selection result, from among the plurality of databases for voice recognition 151 (151-1, 151-2, ..., 151-n), in 124.

According to embodiments of the present disclosure, the processor 110 may detect at least one database for voice recognition 151 (151-1, 151-2, ..., 151-n) corresponding to the selection result by detecting at least one database for voice recognition 151 (151-1, 151-2, ..., 151-n), from which an element corresponding to the contact information selected by the user was detected. For example, if the user selects 'Kangwon' 192d of FIG. 5, the processor 110 may detect a database for voice recognition, from which 'Kangwon' 192d was detected, e.g., the second database for voice recognition 151-2, among the plurality of databases for voice recognition 151 (151-1, 151-2, ..., 151-n).

The result of detecting the database 151-2 may be stored in the storage 150, in 125.

Figure 6:
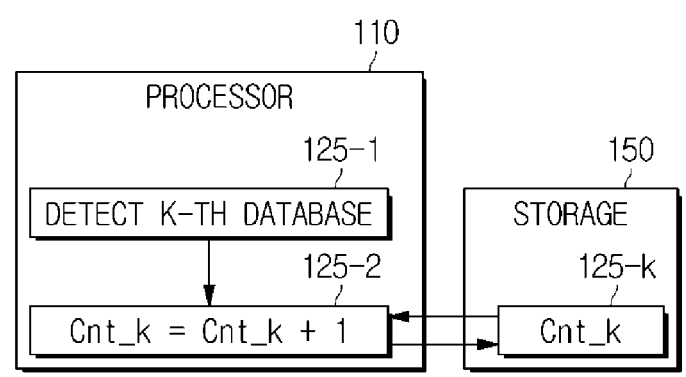
FIG. 6 shows an example of a processor storing information about a database for voice recognition corresponding to a selection result.
Figure 7:
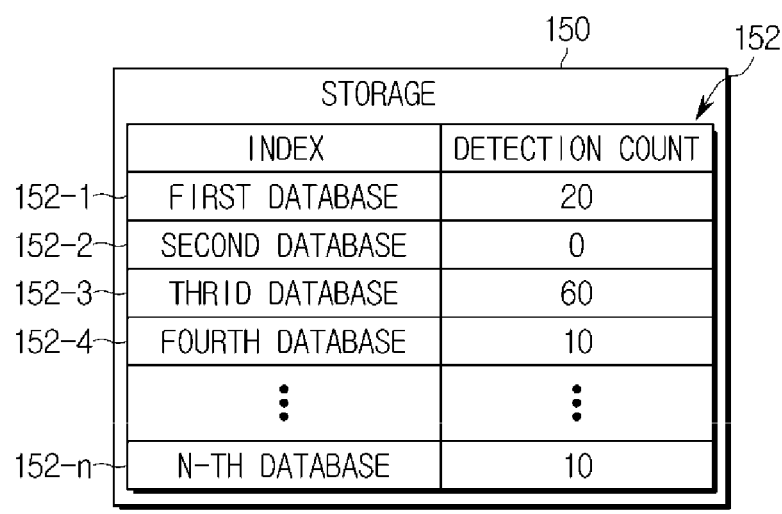
FIG. 7 shows an example of weights for a plurality of databases stored in a storage.

FIG. 6 shows an example of a processor storing information about a database for voice recognition corresponding to a selection result, and FIG. 7 shows an example of weights for a plurality of databases stored in a storage.

As shown in FIG. 6, once a database for voice recognition 151 (151-1, 151-2, ..., 151-n) is detected, the processor 110 may modify the metadata of one of the databases for voice recognition 151 (151-1, 151-2, ..., 151-n), e.g., a weight, and store it. In this case, the weight may include a detection frequency of tone of the databases for voice recognition 151 (151-1, 151-2, ..., 151-n).

For example, the processor 110 may be configured to modify and update a k-th count variable Cnt_k set for the k-th database for voice recognition 151-k, in 125-2. Count variables Cnt_1, Cnt_2, ..., Cnt-k are respectively set to increase according to detection frequencies of the databases for voice recognition 151 (151-1, 151-2, ..., 151-n). Accordingly, the processor 110 may modify and update the detection frequency of one of the databases for voice recognition 151 (151-1, 151-2, ..., 151-n), and store it.

For example, if one of the databases for voice recognition 151 (151-1, 151-2, ..., 151-n), e.g., the second database for voice recognition 151-2 is detected, the processor 110 may call a count variable corresponding to the second database for voice recognition 151-2, i.e., the second count variable Cnt_2, update the second count variable Cnt_2 by incrementing it by 1, and store the updated second count variable Cnt_2 in the storage 150.

As such, updating and storing the count variable Cnt_k may be performed every time one of the databases for voice recognition 151 (151-1, 151-2, ..., 151-n) is detected.

Accordingly, as shown in FIG. 7, detection frequencies, i.e., the number of detection, of the plurality of databases for voice recognition 151 (151-1, 151-2, ..., 151-n) may be stored in the storage 150. In the table of FIG. 7, the left reads the databases for voice recognition 151 (151-1, 151-2, ..., 151-n) and the right reads the count variables Cnt_k of the databases for voice recognition 151 (151-1, 151-2, ..., 151-n).

The detection frequencies of the plurality of databases for voice recognition 151 (151-1, 151-2, ..., 151-n) may be used in detecting at least one element from the respective databases for voice recognition 151 (151-1, 151-2, ..., 151-n).

Figure 8:
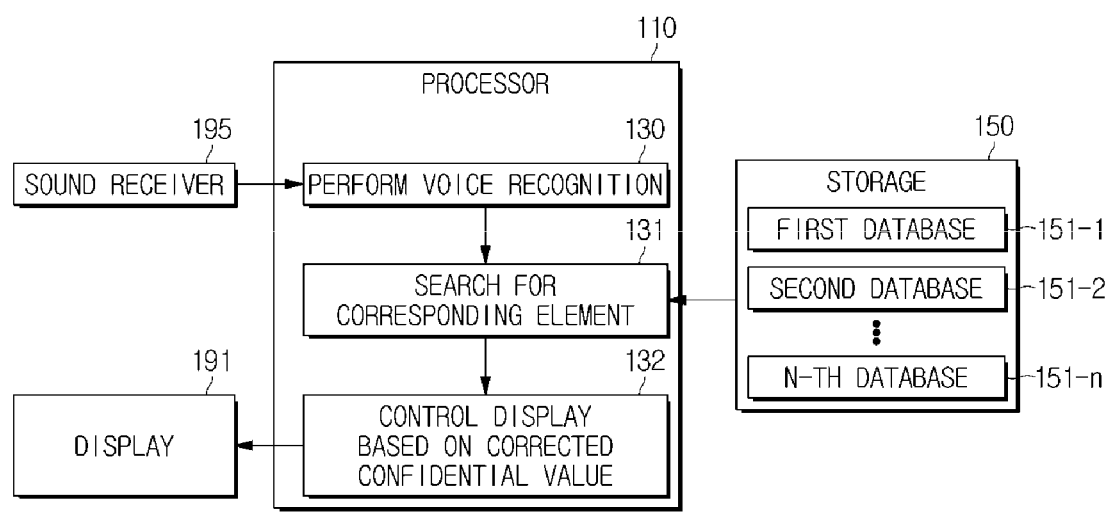
FIG. 8 shows an example of a process of displaying search results based on confidential values corrected by a processor.

FIG. 8 shows an example of a process of displaying search results based on confidential values corrected by a processor.

As shown in FIG. 8, in response to starting of the voice recognition operation, the processor 110 may perform voice recognition 130 by extracting a voice part from a sound sent from the sound receiver 195, and search for and obtain an element corresponding to the voice from the databases for voice recognition 151 (151-1, 151-2, ..., 151-n) stored in the storage 150.

The processor 110 may use the weights, e.g., the count variables Cnt_k, to modify confidential values of respective elements and obtain corrected confidential values, and detect an element corresponding to the voice received from the databases for voice recognition 151 (151-1, 151-2, ..., 151-n) based on the corrected confidential values.

According to embodiments of the present disclosure, the processor 110 may use the weights, e.g., the count variables Cnt_k to modify confidential values of respective elements and obtain corrected confidential values, only if a numerical value recorded for at least one count variable Cnt_k exceeds a predefined first threshold or the total sum of numerical values ΣCnt_k recorded on the count variables Cnt_k exceeds a predetermined second threshold value. At least one of the first and second threshold values may be arbitrarily defined by the user or designer. The at least one of the first and second thresholds may include one (1).

Also, the processor 110 may obtain a corrected confidential value for at least one element detected from a certain database for voice recognition 151 (151-1, 151-2, ..., 151-n) according to Equation 1 as follows:

$$CV_k^{adjusted} = CV_k^{measured} \cdot W_{1k} \qquad (1)$$

In Equation 1, CV^adjusted_k denotes a corrected confidential value for an element extracted from the k-th database for voice recognition 151-k, and CV^measured_k denotes an actually computed or measured confidential value for an element extracted from the k-th database for voice recognition 151-k. In other words, CV^measured_k may include confidential values corresponding to results of comparison of records, features, or patterns of the respective databases for voice recognition 151 (151-1, 151-2, ..., 151-n). K is greater than 1, and is one of natural numbers equal to or smaller than the total number of the databases for voice recognition 151.

W_1k refers to a correction value additionally applied to all elements that may be extracted from the k-th database for voice recognition 151-k to calculate a corrected confidential value for the at least one element extracted from the k-th database for voice recognition 151-k.

The processor 110 may obtain a corrected confidential value CV^adjusted_k by reflecting a certain correction value W_1k onto the calculated or measured confidential value CV^measured_k, as expressed in equation 1.

In this case, to obtain a corrected confidential value CV^adjusted_k corresponding to elements extracted from the same database for voice recognition 151 (151-1, 152-2, ..., 152-n), the same correction value W_11, ..., W-1n may be used. In other words, the corrected confidential values for all elements that may be obtained from the same k-th database 151-k are obtained by calculation using the correction value W_1k equally applied to the elements and individually measured confidential values CV^measured_k.

According to embodiments of the present disclosure, the correction value W_1k may be obtained by the count variable Cnt_t or a partial modification of the count variable Cnt_k.

For example, if detection frequencies 152 (152-1, 152-2, ..., 152-n) for the first to n-th databases for voice recognition 151-1 to 151-n are stored in the storage 150 as shown in FIG. 7, the processor 110 may calculate the correction value W_11, ..., W_1n for the respective databases for voice recognition 151 (151-1, 151-2, ..., 151-n) by dividing a value recorded on the count variable Cnt_k by a numeral value, e.g., 100, defined by the designer in advance and incrementing the obtained value by 1.

The correction value W_11, ..., W_1n is weighted to the actually computed or measured confidential value CV^measured_k for an element extracted from a database for voice recognition, i.e., the k-th database for voice recognition 151-k, and accordingly, the processor 110 may obtain a corrected confidential value for the element extracted from the k-th database for voice recognition 151-k.

In the case of calculating the corrected confidential value CV^adjusted_k in this manner, the corrected confidential value CV^adjusted_k for the element extracted from the k-th database for voice recognition 151-k increases in proportion to an increase in the count variable Cnt_k, i.e., detection frequency 152-k of the k'-h database for voice recognition.

W_1k may be defined in various ways according to the user's arbitrary selection. For example, W_1k may be defined as not being incremented by 1 or as being computed to be the square root of the count variable Cnt_k.

The processor 110 searches for an element based on the corrected confidential value CV^adjusted_k obtained by correcting the confidential value CV^measured_k. In this case, the processor 110 may detect at least one element by extracting at least one record with a corrected confidential value CV^adjusted_k greater than a predetermined threshold from the databases for voice recognition 151 (151-1, 151-2, ..., 151-n).

Subsequently, the processor 110 may control the display 191 of the user interface 190 to display the search results, in 132. In this case, the processor 110 may control the display 191 to display an element detected based on the corrected confidential value CV^adjusted_k, e.g., a detected record's identifier on a screen 192b. Furthermore, the processor 110 may control the display 191 to further display field data corresponding to the element detected based on the corrected confidential value CV^adjusted_k.

The display 191 is operated under the control of the processor 110. For example, the display 191 may sequentially display contact information corresponding to a plurality of elements from top to bottom in the order of having relatively large corrected confidential value CV^adjusted_k, or display one of the plurality of elements with a relatively large corrected confidential value CV^adjusted_k earlier than others.

The user may select one of the at least one element by manipulating the input 193 in such a way as pressing a mechanical button or touching the touch screen, and the processor 110 may modify and update a weight, e.g., a count variable Cnt_k for one of the databases for voice recognition 151 (151-1, 151-2, ..., 151-n) based on the result of the user's selection, as shown in FIG. 6. In response to modification of the count value Cnt_k, the corrected confidential value to be computed by the processor 110 may be changed as well. Accordingly, the element detected by the processor 110 may be changed according to the user's selection, and/or may be displayed on the display 191 in a different sequence than the previous displaying sequence.

Figure 9:
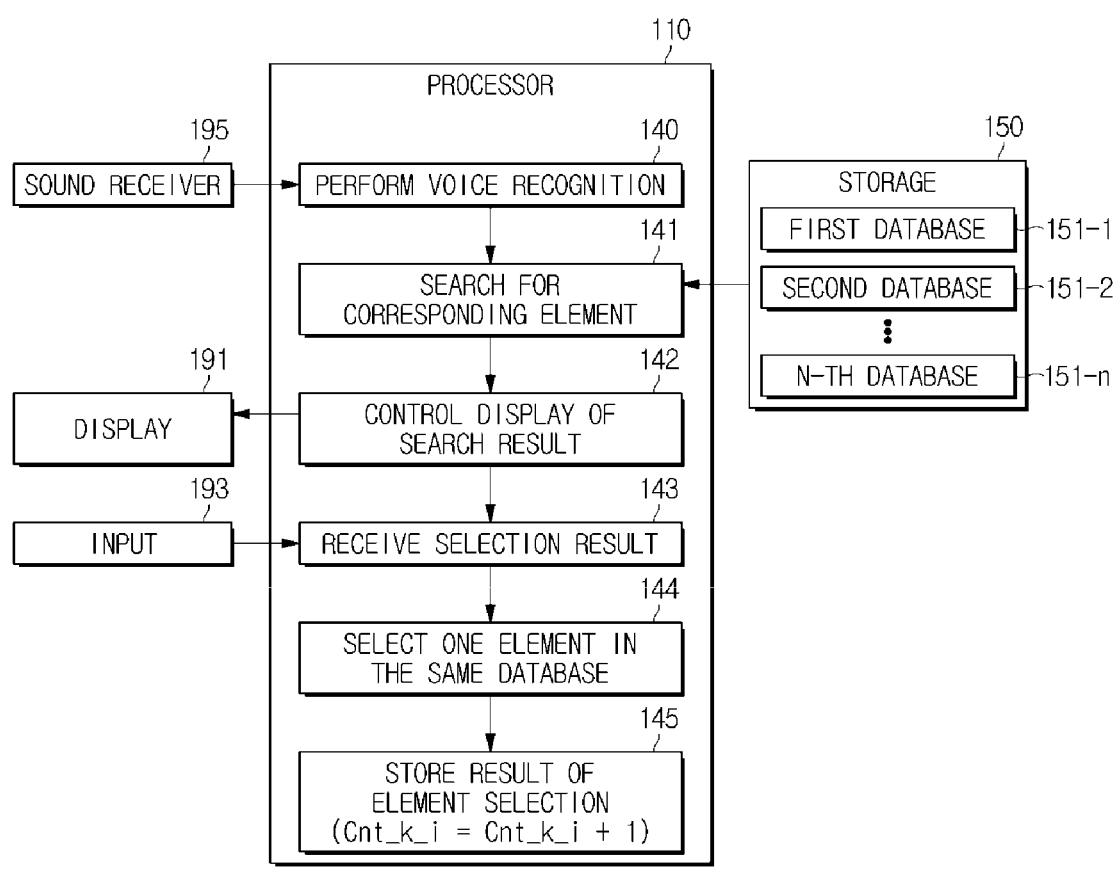
FIG. 9 shows an example of a process of a processor storing results from selection of a record in the same database.

FIG. 9 shows an example of a process of a processor storing results from selection of a record in the same database.

According to embodiments of the present disclosure, if a plurality of elements are detected from one of the databases for voice recognition 151 (151-1, 151-2, ..., 151-n), the processor 110 may search for an element by assigning a higher weight to an element frequently selected by the user from among the detected plurality of elements, and control the search results to be displayed.

Specifically, referring to FIG. 9, the processor 110 may perform voice recognition 140 by extracting a voice part from a sound sent from the sound receiver 195, and search for and obtain an element corresponding to the voice from the databases for voice recognition 151 (151-1, 151-2, ..., 151-n) stored in the storage 150, in 141. Accordingly, the processor 110 may search for and obtain a plurality of elements from at least one of the databases for voice recognition 151 (151-1, 151-2, ..., 151-n).

Once the plurality of elements are obtained, the processor 110 may control the display 191 of the user interface 190 to display the search results, and the display 191 displays the detected elements on the screen.

Subsequently, the user may select one of the at least one element by manipulating the input 193 in such a way as pressing a mechanical button or touching the touch screen, and the processor 110 may receive the selection result in the form of an electric signal, in 143.

If the plurality of elements are detected from the database for voice recognition 151 (151-1, 151-2, ..., 151-n), from which the element selected by the user is detected, in 144, the processor 110 may further store a result of selecting a particular element in the database for voice recognition 151 (151-1, 151-2, ..., 151-n) in the storage 150. In other words, if the user selects one of the plurality of elements detected from one of the databases for voice recognition 151 (151-1, 151-2, ..., 151-n), the processor 110 may further store a result of selecting an element from among the plurality of elements in the storage 150.

The result of selecting a particular element may include a selection frequency of the particular element. In this case, the processor 110 may store the selection frequency of the particular element in the storage 150 by modifying a certain count variable Cnt_k_i assigned to the particular element. For example, if a j-th element of the k-th database for voice recognition 151-k is detected, the processor 110 may modify the j-th element by incrementing a j-th count variable Cnt_k_j corresponding to the j-th element by 1 and store the modified j-th count variable Cnt_K_j in the storage 150.

The j-th count variable Cnt_k_j may be used as a correction value to correct the confidential value for the particular element.

According to embodiments of the present disclosure, the processor 110 may obtain a corrected confidential value for a particular element as in Equation 2 below:

$$CV_k^{adjusted}=CV_k^{measured} \cdot W_{1k} \cdot W_{2k} \quad (2)$$

In Equation 2, CV^adjusted_k denotes a corrected confidential value for an element extracted from the k-th database for voice recognition 151-k, and CV^measured_k denotes an actually computed or measured confidential value for an element extracted from the k-th database for voice recognition 151-k. W_1k refers to a first correction value additionally applied to all elements that may be extracted from the k-th database for voice recognition 151-k. The first correction value may be obtained in the same way as in equation 1.

W_2k refers to a second correction value equally or differently applied to at least one element in the k-th database for voice recognition 151-k. W_2k may be obtained by e.g., modifying or partially modifying the count variable Cnt_k_i corresponding to an i-th element. For example, the processor 110 may obtain the correction value W_2i for a particular i-th element in the particular database for voice recognition 151 (151-1, 151-2, . . . , 151-n) by dividing the count variable Cnt_k_i by a numerical number defined by the designer in advance, e.g., 100 and incrementing the result by 1.

Once the first and second correction values are obtained, the processor 110 may obtain the corrected confidential value using the first and second correction values. Accordingly, even for elements detected from the same database for voice recognition 151 (151-1, 151-2, . . . , 151-n), the confidential values for the detected elements may be differently corrected.

The corrected confidential value may further be used in the process of detecting at least one element from the database for voice recognition 151 (151-1, 151-2, . . . , 151-n) or in the process of displaying the detected at least one element.

Specifically, in a case of searching for an element corresponding to a received voice from the database for voice recognition 151 (151-1, 151-2, . . . , 151-n), the processor 110 may use the first and second correction values to obtain the corrected confidential value before searching for the element, and detect at least one element by extracting at least one record having a corrected confidential value higher than a predetermined threshold.

The display 191 may display the plurality of elements in a predetermined order according to the confidential values corrected using the first and second correction values.

Although the vehicle-mounted voice recognition device 100 was described above, it may be applied to other device than the vehicle 2 as well. For example, the voice recognition device may be installed in other mechanical or electronic device than the vehicle 2, and the electronic device may be applied for a terminal device such as a smart phone or tablet PC, various types of audio or video players, game players, or other devices requiring voice recognition.

Figure 10:
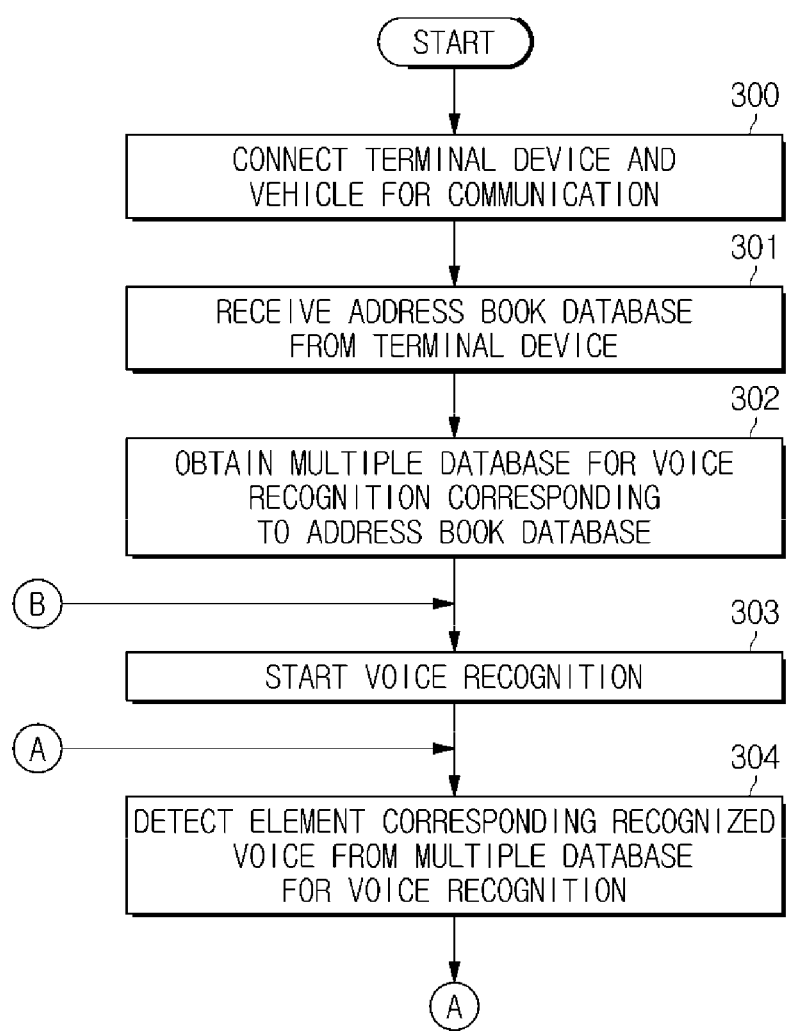
FIG. 10 is a first flowchart of an exemplary a method for controlling a vehicle-mounted voice recognition device according to embodiments of the present disclosure.
Figure 12:
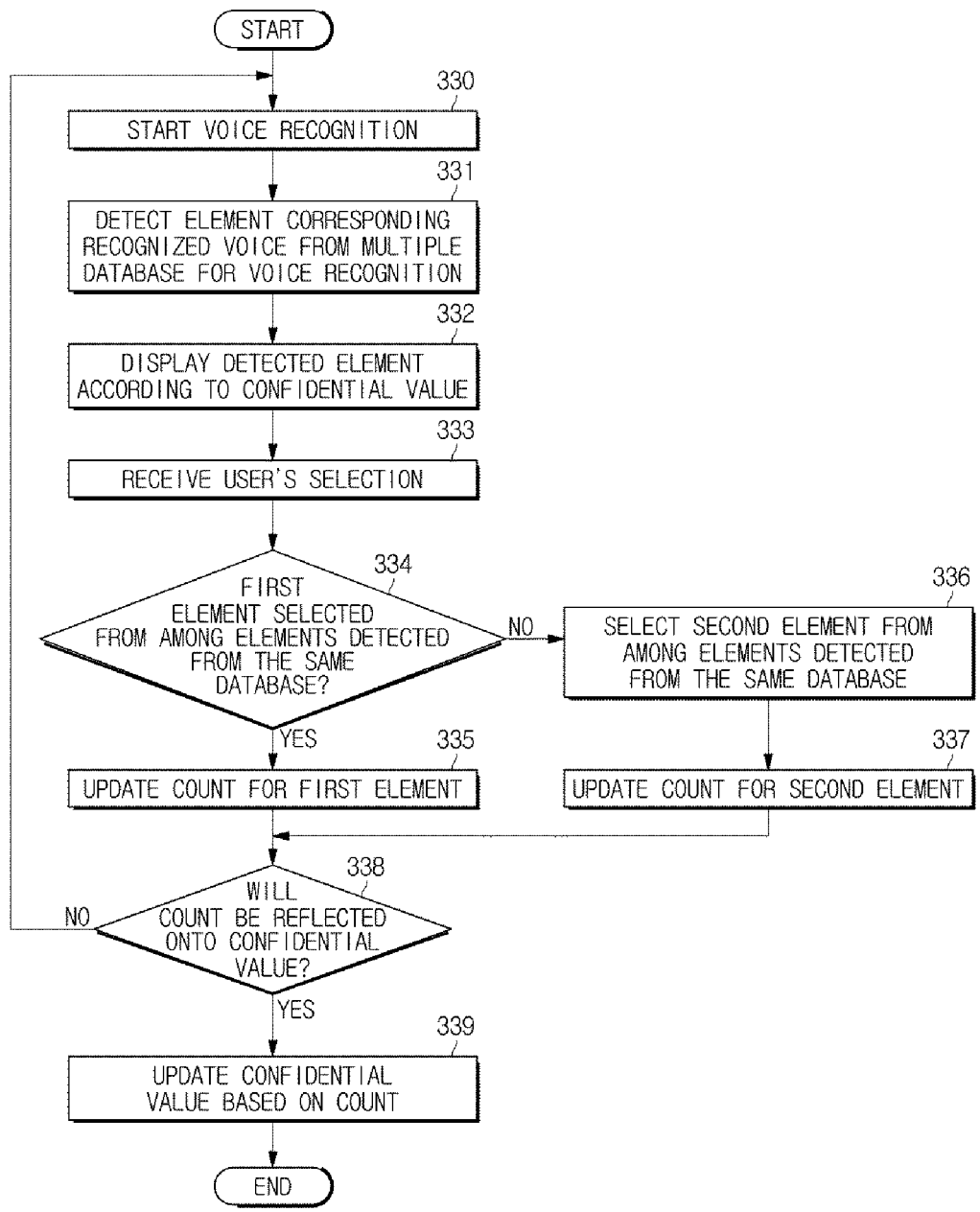
FIG. 12 is a third flowchart of an exemplary a method for controlling a vehicle-mounted voice recognition device according to embodiments of the present disclosure.

Referring to FIGS. 10 and 12, examples of a vehicle-mounted voice recognition device according to embodiments of the present disclosure will now be described.

Figure 11:
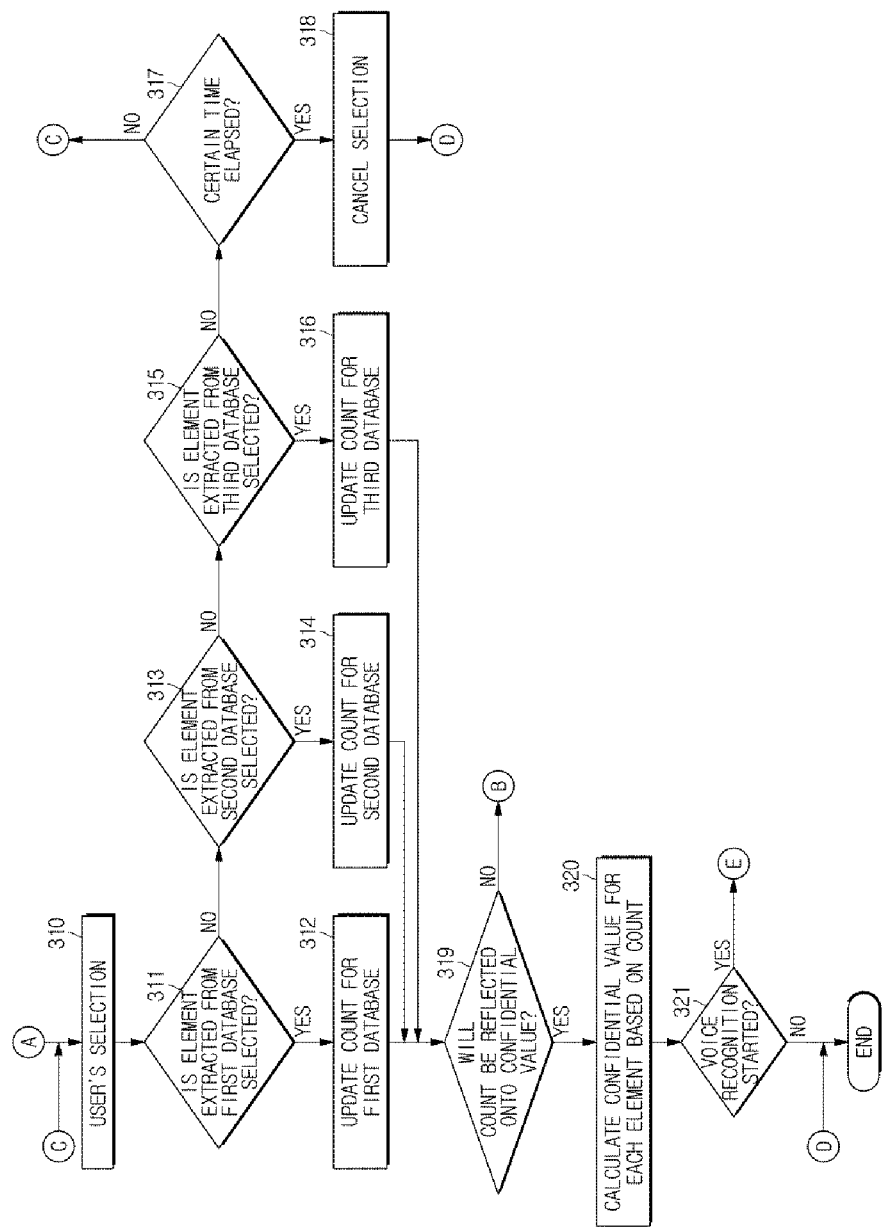
FIG. 11 is s second flowchart of an exemplary a method for controlling a vehicle-mounted voice recognition device according to embodiments of the present disclosure.

FIG. 10 is a first flowchart of an exemplary a method for controlling a vehicle-mounted voice recognition device according to embodiments of the present disclosure, and FIG. 11 is a second flowchart of an exemplary method for controlling a vehicle-mounted voice recognition device according to embodiments of the present disclosure.

Referring first to FIG. 10, a vehicle-mounted voice recognition device installed in a vehicle and a terminal device are first paired to communicate with each other, in 300.

In response to the paring of the vehicle-mounted voice recognition device and the terminal device, the vehicle-mounted voice recognition device receives an address book database from the terminal device, in 301.

The vehicle-mounted voice recognition device obtains a plurality of databases for voice recognition from the address book database, in 302. In this case, the vehicle-mounted voice recognition device may read out respective records of the address book database, and use data stored in the respective records to create a plurality of databases for voice recognition, e.g., first to third databases for voice recognition.

For example, the vehicle-mounted voice recognition device may create a database for voice recognition by combining a family name and a first name stored in each record in the order of the first name and the family name and using the combination of the first name and the family name and corresponding field data, or may build another database for voice recognition by combining a family name and a first name stored in each record in the order of the family name and the first name and using the combination of the family name and the first name and corresponding field data. Furthermore, the vehicle-mounted voice recognition device may create yet another database for voice recognition by obtaining at least one of a family name and a first name from each record and using the obtained family name or first name and corresponding field data. In addition, the vehicle-mounted voice recognition device may further create a database for voice recognition related to a monosyllabic word frequently used by the user and a database for voice recognition related to a uniquely pronounced word. Besides, the vehicle-mounted voice recognition device may further create various databases for voice recognition that may be considered by the designer based on the address book database.

According to the user's manipulation or a predetermined setting, operation of voice recognition of the vehicle-mounted voice recognition device is prepared and started, in 303. The user may speak e.g., a family name, a first name, a combination of the family name and the first name, or a title of a person to make a call with, and the vehicle-mounted voice recognition device recognizes the voice produced by the user.

The vehicle-mounted voice recognition device detects at least one element corresponding to the recognized voice from at least one of the plurality of database for voice recognition obtained in 302, according to the result of recognizing the voice, in 304. An element corresponding to the recognized voice includes at least one of a family name, a first name, a combination of the family name and the first name, a monosyllabic word, and a uniquely pronounced word.

In this case, the vehicle-mounted voice recognition device may detect at least one element based on confidential values for the respective elements. For example, the vehicle-mounted voice recognition device may detect elements with confidential values exceeding a certain threshold.

Contact information corresponding to the detected at least one element is visually or audibly provided to the user, and the user may select one of the at least one contact information, in 310, as shown in FIG. 11. In a case of displaying the contact information visually, the contact information may be displayed in a predetermined order of displaying contact information. The predetermined order of displaying contact information may be determined based on the confidential value of the element corresponding to the contact information.

Once the user selects a piece of contact information, a call is made between the vehicle-mounted voice recognition device and an outside terminal device corresponding to the selected contact information by using a terminal device paired with the vehicle-mounted voice recognition device.

If an element corresponding to the contact information selected by the user is detected from the first database for voice recognition in 311, the vehicle-mounted voice recognition device updates a count variable corresponding to the first database for voice recognition by incrementing the count variable by 1, in 312.

If an element corresponding to the contact information selected by the user is detected not from the first database for voice recognition but from the second database for voice recognition in 311, the vehicle-mounted voice recognition device updates a count variable corresponding to the second database for voice recognition by incrementing the count variable by 1, in 314.

If an element corresponding to the contact information selected by the user is detected not from the first and second databases for voice recognition but from the third database for voice recognition in 313, the vehicle-mounted voice recognition device updates a count variable corresponding to the third database for voice recognition by incrementing the count variable by 1, in 316.

If an element corresponding to the contact information selected by the user is detected not from the first to third databases for voice recognition in 315, the vehicle-mounted voice recognition device may perform a certain operation according to predefined settings.

For example, the vehicle-mounted voice recognition device determines time elapsed using a clock, and if the time elapsed exceeds a predetermined time, in 318, the vehicle-mounted voice recognition device determines that there is an error in the user's selection, cancels the user's selection, and stops the voice recognition process and the call-making process, in 318.

If the time elapsed does not exceed the predetermined time in 317, the vehicle-mounted voice recognition device waits until there is an input of the user's selection, in 310, or re-detects at least one element corresponding to the recognized voice from at least one of the plurality of databases for voice recognition and wait for the user's selection, in 304.

If the count for at least one of the plurality of databases for voice recognition is updated, in 312, 314, 316, the vehicle-mounted voice recognition device determines whether to reflect a value recorded on the count variable onto a confidential value, in 319.

Whether to reflect a value recorded on the count variable onto a confidential value may be determined according to predefined settings or the user's selection. For example, if a value recorded on a count variable exceeds a predetermined first threshold or the total sum of numerical values recorded on count variables exceeds a predetermined second threshold, the vehicle-mounted voice recognition device determines to reflect the count variable to the confidential value, in 319. On the contrary, if the value recorded on the count variable is less than the predetermined first threshold or the total sum of numerical values recorded on the count variables is less than the predetermined second threshold, the vehicle-mounted voice recognition device determines not to reflect the count variable to the confidential value, in 319.

If it is determined to reflect the count variable to the confidential value, the vehicle-mounted voice recognition device corrects the confidential value based on the count variable and computes a corrected confidential value, in 320.

In this case, the vehicle-mounted voice recognition device may calculate a certain correction value based on the value recorded on the count variable as described above in connection with equation 1, and obtain a corrected confidential value by weighting the calculated correction value to the confidential value. The certain correction value may be defined by, e.g., dividing a value recorded on the count variable by a numerical value predefined by the designer and adding another numerical value to the division result.

Subsequently, once another voice recognition is started in 321, the vehicle-mounted voice recognition device detects at least one element corresponding to the recognized voice from at least one of the plurality of databases for voice recognition obtained in 302 based on the voice recognition result, displays contact information corresponding to the detected element, and if one piece of the displayed contact information is selected in 310, makes a call and updates the count value based on the selected contact information, in 311 to 318.

FIG. 12 is a third flowchart of an exemplary a method for controlling a vehicle-mounted voice recognition device according to embodiments of the present disclosure.

As shown in FIG. 12, once voice recognition is started in 330, an element corresponding to the recognized voice is detected from a plurality of databases for voice recognition, in 300. In this case, a plurality of elements may be detected from a single database for voice recognition.

The plurality of databases for voice recognition may be obtained using an address book database of at least one terminal device paired with the vehicle-mounted voice recognition device, as described above.

An element corresponding to the recognized voice includes at least one of a family name, a first name, the family name followed by the first name (or vice versa), a monosyllabic word, and a uniquely pronounced word.

Detection of an element may be performed based on confidential values for the respective elements. For example, an element with a confidential value exceeding a certain threshold may be detected.

Contact information corresponding to the detected at least one element is determined, and visually or audibly provided for the user, in 332. In a case of displaying the contact information visually, a plurality of pieces of the contact information may be displayed in an order of displaying contact information. The order of displaying contact information may be determined based on confidential values of elements corresponding to the contact information.

For example, if a plurality of elements, e.g., first and second elements are detected from the same database and the user selects the first element from among the plurality of elements, in 344, the count variable corresponding to the first element is updated, in 335.

If the user selects the first element from among the plurality of elements, in 344, a count for the first element is updated, in 335. If the user selects not the first element but the second element in 334, the count variable corresponding to the second element is updated, in 337.

Although an instance where two elements are detected from the same database is shown in FIG. 12, it may be applied for other instances where three or more elements are detected, equally or through partial modification.

If the count for at least one of the plurality of databases for voice recognition is updated, in 312, 335, 337, the vehicle-mounted voice recognition device determines whether to reflect a value recorded on the count variable onto a confidential value, in 338.

Whether to reflect a value recorded on the count variable onto a confidential value may be determined according to predefined settings or the user's selection. For example, if a value recorded on a count variable exceeds a predetermined first threshold or the total sum of numerical values recorded on count variables exceeds a predetermined second threshold, the vehicle-mounted voice recognition device determines to reflect the count variable to the confidential value, in 338. On the contrary, if the value recorded on the count variable is less than the predetermined first threshold or the total sum of numerical values recorded on the count variables is less than the predetermined second threshold, the vehicle-mounted voice recognition device determines not to reflect the count variable to the confidential value, in 338.

If it is determined to reflect the count variable to the confidential value, the vehicle-mounted voice recognition device calculates and updates a corrected confidential value based on the count variable, in 339. This may be attained by the above equation 2.

Once the confidential value is updated, the updated confidential value is used to detect an element corresponding to the recognized voice from the plurality of databases for voice recognition in 331, and/or to determine an order of displaying contact information corresponding to the detected element in 332.

The method for controlling the vehicle-mounted voice recognition device may also be applied to a method for controlling a vehicle equally or through partial modification.

According to embodiments of the present disclosure, a vehicle-mounted voice recognition device, vehicle including the same, vehicle-mounted voice recognition system, and method for controlling the same, as described hereinabove, may beneficially provide the user with more suitable voice recognition results, e.g., contact search results, which meet the user's usage pattern or intension.

Furthermore, the vehicle-mounted voice recognition device, vehicle including the same, vehicle-mounted voice recognition system, and method for controlling the same, as described hereinabove, a more suitable contact from a contact database may be detected based on the user's style of language usage.

Furthermore, the vehicle-mounted voice recognition device, vehicle including the same, vehicle-mounted voice recognition system, and method for controlling the same, as described hereinabove, may provide the user with more suitable contacts to meet the user's intention more promptly even if multiple contact databases are created based on a contact database on a terminal device.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A vehicle-mounted voice recognition device comprising:
   a storage configured to store a plurality of databases for voice recognition generated based on an address book database sent from a terminal device;
   a processor configured to detect at least one element from the plurality of databases for voice recognition and determine an order of displaying contact information corresponding to the at least one element; and
   a user interface configured to display the contact information corresponding to the at least one element in the order of displaying and receive a selection of a piece of the contact information from a user,
   wherein the processor is further configured to detect a database among the plurality of databases for voice recognition, the detected database including an element corresponding to the selected piece of contact information, and re-determine the order of displaying the contact information based on detection frequencies of the plurality of databases for voice recognition.

2. The vehicle-mounted voice recognition device of claim 1, further comprising:
   a sound receiver configured to receive a voice of the user and output a sound signal,
   wherein the processor is further configured to perform voice recognition on the sound signal to detect at least one element corresponding to the voice of the user from the plurality of databases for voice recognition.

3. The vehicle-mounted voice recognition device of claim 2, wherein the processor is further configured to further detect a confidential value for each of the at least one element corresponding to the voice of the user.

4. The vehicle-mounted voice recognition device of claim 3, wherein the processor is further configured to generate a corrected confidential value by modifying the confidential value for each of the at least one element according to the detection frequencies of the plurality of databases for voice recognition.

5. The vehicle-mounted voice recognition device of claim 3, wherein, when a database among the plurality of databases for voice recognition including an element corresponding to the selected piece of contact information is detected, the processor is further configured to increment and update a count corresponding to the detected database.

6. The vehicle-mounted voice recognition device of claim 5, wherein the processor is further configured to use a confidential value for each of the at least one element and the count corresponding to the detected database to determine a corrected confidential value for each of the at least one element.

7. The vehicle-mounted voice recognition device of claim 6, wherein the processor is further configured to use the corrected confidential value for each of the at least one element to re-determine the order of displaying the contact information.

8. The vehicle-mounted voice recognition device of claim 1, wherein the processor is further configured to use selection frequencies of a plurality of elements in the detected database to re-determine the order of displaying the contact information.

9. The vehicle-mounted voice recognition device of claim 1, wherein the processor is further configured to make a call with an outside terminal device corresponding to the selected piece of contact information using the terminal device.

10. The vehicle-mounted voice recognition device of claim 1, wherein the at least one element includes at least one of a family name, a first name, the first name followed by the family name, the family name followed by the first name, a monosyllabic word, and a uniquely pronounced word.

11. A method for controlling a vehicle-mounted voice recognition device, the method comprising:
    receiving an address book database sent from a terminal device;
    generating a plurality of databases for voice recognition based on the address book database;
    detecting at least one element from the plurality of databases for voice recognition;
    determining an order of displaying contact information corresponding to the at least one element;
    displaying the contact information corresponding to the at least one element in the order of displaying;
    receiving a selection of a piece of the contact information from a user;

detecting a database among the plurality of databases for voice recognition, the detected database including an element corresponding to the selected piece of contact information; and re-determining the order of displaying contact information based on detection frequencies of the plurality of databases for voice recognition.

12. The method of claim 11, wherein the detecting of the at least one element from the plurality of databases for voice recognition comprises:

receiving a voice of the user; and outputting a sound signal; and performing voice recognition on the sound signal to detect at least one element from the plurality of databases for voice recognition.

13. The method of claim 12, wherein the performing of voice recognition on the sound signal comprises:

detecting the at least one element and a confidential value for each of the at least one element.

14. The method of claim 13, wherein the re-determining of the order of displaying contact information comprises:

generating a corrected confidential value by modifying the confidential value for each of the at least one element according to the detection frequencies of the plurality of databases for voice recognition.

15. The method of claim 13, wherein the re-determining of the order of displaying contact information comprises:

when a database among the plurality of databases for voice recognition including an element corresponding to the selected piece of contact information is detected, incrementing and updating a count corresponding to the detected database.

16. The method of claim 15, wherein the re-determining of the order of displaying contact information comprises:

using a confidential value for each of the at least one element and the count corresponding to the detected database to determine a corrected confidential value for each of the at least one element.

17. The method of claim 16, wherein the re-determining of the order of displaying contact information comprises:

using the corrected confidential value for each of the at least one element to re-determine the order of displaying the contact information.

18. The method of claim 11, further comprising:

using selection frequencies of a plurality of elements in the detected database to re-determine the order of displaying the contact information.

19. The method of claim 11, further comprising:

making a call with an outside terminal device corresponding to the selected piece of contact information using the terminal device.

20. The method of claim 11, wherein the at least one element includes at least one of a family name, a first name, the first name followed by the family name, the family name followed by the first name, a monosyllabic word, and a uniquely pronounced word.

21. A vehicle-mounted voice recognition system comprising:

a terminal device including an address book database; and a vehicle-mounted voice recognition device configured to receive the address book database from the terminal device; generate a plurality of databases for voice recognition based on the address book database; detect at least one element from the plurality of databases for voice recognition; determine an order of displaying contact information corresponding to the at least one element; display the contact information corresponding to the at least one element in the order of displaying; and receive a selection of a piece of the contact information from a user, wherein the vehicle-mounted voice recognition device is further configured to detect a database among the plurality of databases for voice recognition, the detected database including an element corresponding to the selected piece of contact information, and re-determine the order of displaying the contact information based on detection frequencies of the plurality of databases for voice recognition.

22. A vehicle comprising:

a storage configured to store a plurality of databases for voice recognition generated based on an address book database sent from a terminal device;

a processor configured to detect at least one element from the plurality of databases for voice recognition and determine an order of displaying contact information corresponding to the at least one element; and a user interface configured to display the contact information corresponding to the at least one element in the order of displaying and receive a selection of a piece of the contact information from a user, wherein the processor is further configured to detect a database among the plurality of databases for voice recognition, the detected database including an element corresponding to the selected piece of contact information, and re-determine the order of displaying the contact information based on detection frequencies of the plurality of databases for voice recognition.

* * * * *